United States Patent
Tasaka et al.

(10) Patent No.: US 9,049,414 B2
(45) Date of Patent: Jun. 2, 2015

(54) DEVICE FOR RECORDING AND REPRODUCING IMAGE, METHOD FOR RECORDING AND REPRODUCING IMAGE, AND RECORDING MEDIUM

(75) Inventors: Shuichi Tasaka, Seongnam-si (KR); Jung-suk Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/817,703

(22) PCT Filed: Aug. 19, 2011

(86) PCT No.: PCT/KR2011/006104
§ 371 (c)(1),
(2), (4) Date: Apr. 9, 2013

(87) PCT Pub. No.: WO2012/023822
PCT Pub. Date: Feb. 23, 2012

(65) Prior Publication Data
US 2013/0188925 A1 Jul. 25, 2013

Related U.S. Application Data

(60) Provisional application No. 61/375,104, filed on Aug. 19, 2010.

(30) Foreign Application Priority Data

Aug. 17, 2011 (KR) .................. 10-2011-0081815

(51) Int. Cl.
*H04N 5/94* (2006.01)
*H04N 9/79* (2006.01)
*G11B 27/30* (2006.01)
*G11B 27/32* (2006.01)
*H04N 5/76* (2006.01)

(Continued)

(52) U.S. Cl.
CPC .............. *H04N 9/79* (2013.01); *G11B 27/3027* (2013.01); *G11B 27/329* (2013.01); *H04N 5/76* (2013.01); *H04N 9/8205* (2013.01); *H04N 9/8227* (2013.01); *H04N 13/0055* (2013.01); *G11B 27/034* (2013.01)

(58) Field of Classification Search
None
See application file for complete search history.

(56) References Cited

U.S. PATENT DOCUMENTS

2005/0206630 A1* 9/2005 MacLaurin ................. 345/204
2006/0269226 A1 11/2006 Ito et al.
(Continued)

FOREIGN PATENT DOCUMENTS

KR 10-2009-0081933 A 7/2009
KR 10-2009-0087793 A 8/2009
(Continued)

OTHER PUBLICATIONS

Written Opinion (PCT/ISA.237), dated Feb. 20, 2012, issued by the Intellectual Searching Authority in counterpart International Application No. PCT/KR2011/006104.
(Continued)

*Primary Examiner* — William C Vaughn, Jr.
*Assistant Examiner* — Eileen Adams
(74) *Attorney, Agent, or Firm* — Sughrue Mion, PLLC

(57) ABSTRACT

Provided are an image recording and playing method including generating a play list including 3D information and recording the generated play list to a recording medium.

20 Claims, 11 Drawing Sheets

(51) Int. Cl.
*H04N 13/00* (2006.01)
*G11B 27/034* (2006.01)
*H04N 9/82* (2006.01)

(56) References Cited

U.S. PATENT DOCUMENTS

| | | |
|---|---|---|
| 2009/0202227 A1 | 8/2009 | Jang et al. |
| 2010/0202759 A1 | 8/2010 | Sasaki et al. |
| 2010/0271465 A1 | 10/2010 | Lee et al. |
| 2010/0289876 A1 | 11/2010 | Shin et al. |
| 2010/0303444 A1* | 12/2010 | Sasaki et al. .................. 386/248 |
| 2011/0261158 A1 | 10/2011 | Suh et al. |

FOREIGN PATENT DOCUMENTS

| | | |
|---|---|---|
| KR | 10-2010-0040708 A | 4/2010 |
| WO | 2010/076933 A1 | 7/2010 |

OTHER PUBLICATIONS

International Search Report (PCT/ISA/210), dated Feb. 20, 2012, issued by the Intellectual Searching Authority in counterpart International Application No. PCT/KR2011/006104.

Communication dated Jan. 7, 2014 issued by the European Patent Office in counterpart European Patent Application No. 11818422.5.

* cited by examiner

<PLAY LIST AND CLIP BEFORE EDITING>

<DIVIDE OPERATION>

<INTEGRATION OPERATION>

| VALUE | COUNTRY | MEDIA | BROADCASTING CHANNEL | 3D FORMAT INFORMATION |
|---|---|---|---|---|
| 0 | USA | Cable TV | CBS | Top and bottom |
| 1 | USA | Cable TV | DirecTV | Side by side |
| 2 | Korea | Satellite | Sky Life | Side by side |
| 3 | Korea | Cable TV | CJ Hellovision | Top and bottom |
| 4 | Japan | Satellite | Sky perfect TV | Side by side |
| 5 | Japan | Satellite | BS11 | Side by side |
| 6 | England | Satellite | BSkyB | Top and bottom |
| – | – | – | – | – |
| – | – | – | – | – |

| Syntax | No. of bits |
|---|---|
| ULAppInfoPlayList() { | |
| length | 32 |
| Three_dimensional_content_Flag | 1 |
| Three_dimensional_content_side by side | 1 |
| Three_dimensional_content_top and bottom | 1 |
| Three_dimensional_content_frame packing | 1 |
| Three_dimensional_content_2D+depth | 1 |
| reserved_for_Three_dimensional_content_ | 3 |
| reserved_for_future_use | 8 |
| PlayList_character_set | 8 |

DEVICE FOR RECORDING AND REPRODUCING IMAGE, METHOD FOR RECORDING AND REPRODUCING IMAGE, AND RECORDING MEDIUM

CROSS-REFERENCE TO RELATED APPLICATIONS

This application is a National Stage application under 35 U.S.C. §371 of International Application No. PCT/KR2011/006104, filed on Aug. 19, 2011, claims the benefit of U.S. Provisional Application No. 61/375,104, filed on Aug. 19, 2010 in the United States Patent and Trademark Office, and claims priority from Korean Patent Application No. 10-2011-0081815, filed on Aug. 17, 2011 in the Korean Intellectual Property Office, the disclosures of which are incorporated herein by reference in their entireties.

BACKGROUND

1. Field

Apparatuses and methods consistent with exemplary embodiments relate to image recording and playing, and an information storage medium for storing the image and from which the stored image is played.

2. Description of the Related Art

In regards to three-dimensional (3D) home standardization, 3D master contents for homes are being discussed by 3D @HOME CONSORTIUM, CONSUMER ELECTRONICS ASSOCIATION (CEA), SOCIETY OF MOTION PICTURE AND TELEVISION ENGINEERS (SMPTE) of the United States, etc., and 3D broadcasting standards are being discussed by ADVANCED TELEVISION SYSTEMS COMMITTEE (ATSC) standards of the United States and by ASSOCIATION OF RADIO INDUSTRIES AND BUSINESS (ARIB) of Japan. At the same time, in the U.S. market, 3D broadcasting for sports such as soccer, basketball, and baseball via satellite broadcasting has already begun due to a current lack of 3D contents.

In the future, an increase of 3D image streams transmitted through cables and the Internet is anticipated.

3D broadcasting formats may vary according to broadcasting stations (or broadcasting channels) or transfer paths, and thus, 3D broadcasting formats may vary even within the same country. Accordingly, systems are demanded to be established such that compatibility is provided even if the number of types of 3D broadcasting formats increases so that end users may not be confused. Also, in regard to editing, measures of arousing users' attention or measures of preventing editing between different 3D broadcasting formats are demanded.

SUMMARY

One or more exemplary embodiments provide an image recording and playing method and apparatus for recording and playing a play list including 3D information, and a recording medium for storing and accessing the play list.

According to an aspect of an exemplary embodiment, there is provided a method of recording an image by using an image recording apparatus, the method including: generating a play list including 3D information; and recording the generated play list to a recording medium, wherein the included 3D information includes at least one of a 3D flag for identifying a 3D image signal and 3D format information, wherein the generated play list includes at least one play item, and the at least one play item includes play start time information, play end time information, and a clip information file corresponding to the at least one play item, and wherein the clip information file includes information about a position and time of a packet in a clip audio/video (AV) stream file corresponding to the clip information file.

The generating may further include stopping integration of play lists in which different 3D format information are included.

The generating may include detecting the 3D information from at least one of metadata of a broadcasting signal and a mapping table between broadcasting channels and the 3D format information.

The generating may further include generating a play list including information indicating that the 3D format information is unclear when the 3D flag is detected but the 3D format information is not detected from the broadcasting signal.

The generating may further include generating a play list including information indicating a two-dimensional (2D) image signal when both of the 3D flag and the 3D format information are not detected.

The generating may include generating a play list including information about whether glasses are used to view the image, based on the 3D format information.

According to an aspect of another exemplary embodiment, there is provided an image recording including: a play list generator which generates a play list including 3D information; and a recorder which records the generated play list to a recording medium, wherein the included 3D information includes a 3D flag for identifying at least one of a 3D image signal and 3D format information, wherein the generated play list includes at least one play item, and the at least one play item includes play start time information, play end time information, and a clip information file corresponding to the at least one play item, and wherein the clip information file includes information about a position and time of a packet in a clip audio/video (AV) stream file corresponding to the clip information file.

The play list generating unit may stop integration of play lists in which different 3D format information are included.

The play list generating unit may include: a 3D information detector which detects the 3D information from at least one of metadata of a broadcasting signal and a mapping table between broadcasting channels and the 3D format information; and a storage which stores the mapping table.

The play list generator may generate a play list including information indicating that the 3D format information is unclear when the 3D flag is detected but the 3D format information is not detected from the broadcasting signal.

The play list generator may generate a play list including information indicating a 2D image signal when both of the 3D flag and the 3D format information are not detected.

The play list generator may generate a play list including information about whether glasses are used to view the image, based on the 3D format information.

According to an aspect of another exemplary embodiment, there is provided a method of playing an image by using an image playing apparatus, the method including: reading a play list including 3D information; and playing the image by using the read play list, wherein the included 3D information includes at least one of a 3D flag for identifying a 3D image signal and 3D format information, and the read play list includes at least one play item, and the at least one play item includes play start time information, play end time information, and a clip information file corresponding to the at least one play item, and wherein the clip information file includes information about a position and time of a packet in a clip audio/video (AV) stream file corresponding to the clip information file.

The generating may include displaying the play list including the 3D information.

The generating may include stopping integration of play lists in which different 3D format information are included.

The generating may include displaying play lists in which different 3D format information are recorded or a stop message.

According to an aspect of another exemplary embodiment, there is provided an image playing apparatus including: a player which reads a play list including 3D information and plays data by using the read play list, wherein the included 3D information includes at least one of a 3D flag for identifying a 3D image signal and 3D format information, and the read play list includes at least one play item, and the at least one play item includes play start time information, play end time information, and a clip information file corresponding to the at least one play item, and wherein the clip information file includes information about a position and time of a packet in a clip audio/video (AV) stream file corresponding to the clip information file.

The player may display the play list including the 3D information.

The player may stop integration of the play lists in which different pieces of 3D information are included, based on the play list including the 3D information.

According to an aspect of another exemplary embodiment, there is provided a non-transitory recording medium including an image signal and a play list about the image signal, wherein the play list about the image signal includes 3D information, wherein the 3D information includes at least one of a 3D flag which identifies, to a computer, that the image signal is a 3D image signal, and 3D format information which identifies, to the computer, a format of the 3D image signal, wherein the play list includes at least one play item, and the at least one play item includes play start time information, play end time information, and a clip information file corresponding to the play item, wherein the clip information file includes information about a position and time of a packet in a clip audio/video (AV) stream file corresponding to the clip information file.

DETAILED DESCRIPTION OF EXEMPLARY EMBODIMENTS

The description below and the attached drawings are provided to gain an understanding of operations according to exemplary embodiments. Descriptions of elements or operations that may be easily implemented by one of ordinary skill in the art may be omitted.

The description and the drawings are not provided for limitation, and the scope of the inventive concept should be defined by the appended claims. The meaning of the terms used in the present specification and claims should be construed as meanings and concepts not departing from the spirit and scope of the inventive concept based on the principle that the inventor is capable of defining concepts of terms in order to describe exemplary embodiments in the most appropriate way.

Hereinafter, exemplary embodiments will be described with reference to the attached drawings.

Figure 1:
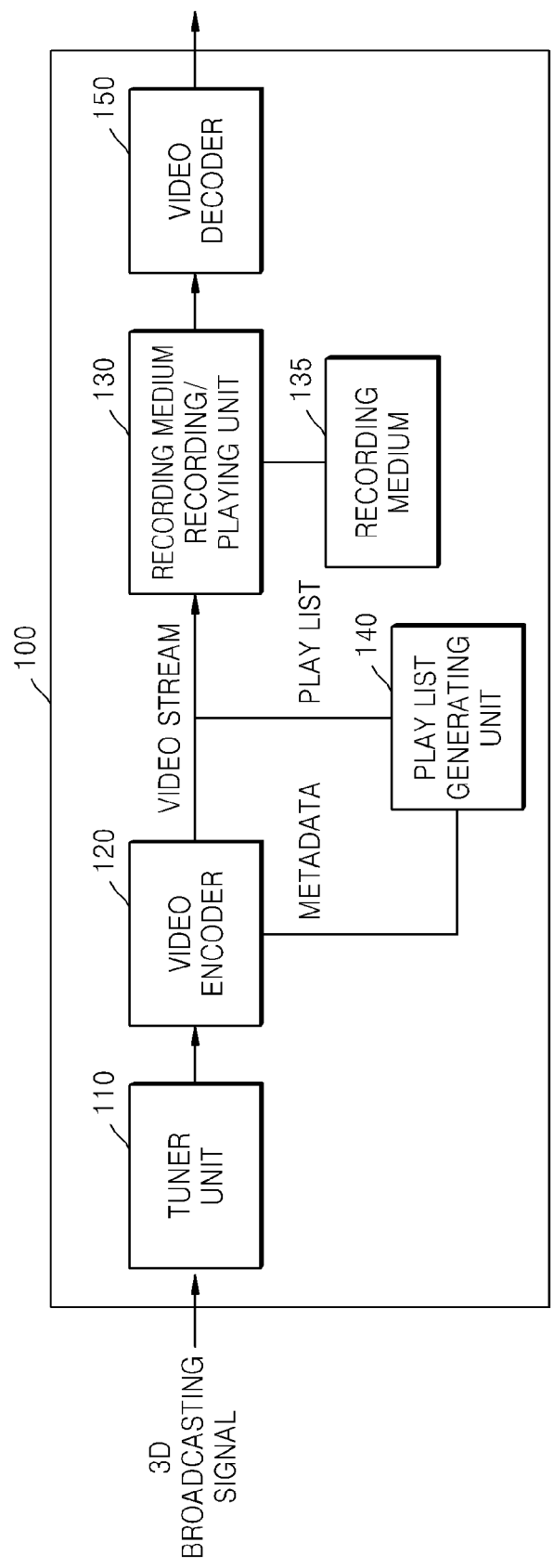
FIG. 1 is a block diagram illustrating an image recording/playing apparatus 100 according to an exemplary embodiment.

FIG. 1 is a block diagram illustrating an image recording/playing apparatus 100 according to an exemplary embodiment.

Hereinafter, the image recording/playing apparatus 100 that receives a broadcasting signal will be described as an example. However, the image recording/playing apparatus 100 according to the current exemplary embodiment may not only obtain an image signal from a broadcasting signal but may also capture an image signal, receive the image signal from an external device through at least one of a wired and wireless connection, etc. Examples of the image recording/playing apparatus 100 according to the current exemplary embodiment may include a TV and a camcorder, but are not limited thereto.

The image recording/playing apparatus 100 according to the current exemplary embodiment may include a tuner unit 110 (e.g., tuner), a video encoder 120, a recording medium recording/playing unit 130 (e.g., a recording medium recorder/player), a recording medium 135, a play list generating unit 140 (e.g., play list generator), and a video decoder 150. For example, FIG. 1 schematically illustrates a 3D broadcasting image that is recorded to a recording type Blu-ray disc (BD), although it is understood that one or more exemplary embodiments are not limited thereto.

In the present exemplary embodiment, a broadcasting signal is transmitted from a broadcasting station via, for example, a satellite, a terrestrial wave, or broadband circuits. The broadcasting station provides a 3D exclusive channel or uses both 2D channels and 3D channels. In the case of 3D contents, depth information may be added to a 2D signal to produce a 3D image, and thus, a complex transmission method in which a 2D signal is received via a terrestrial wave and depth information is transmitted via a broadband circuit may also be regarded.

The tuner unit 110 receives a broadcasting signal that has been compressed by compression technology such as Moving Pictures Expert Group 2 (MPEG2) or MPEG 4 Multiview Video Coding (MVC).

The recording medium recording/playing unit 130 records the received signal to a recording medium 135 as a bit stream as in a 2D format.

The recording medium 135 includes a broadcasting signal and a play list regarding the broadcasting signal, and the play list regarding the broadcasting signal includes 3D information.

The recording medium 135 may be a BD or a hard disk drive (HDD), but may also be a semiconductor memory such as a solid-state drive (SSD) or a memory card instead of a disc. However, it is understood that the recording medium 135 is not limited thereto.

Alternatively, the video encoder 120 may recompress and convert the received broadcasting signal in real-time, and the recording medium recording/playing unit 130 may record the broadcasting signal that has been recompressed and converted.

The play list generating unit 140 generates a play list including 3D information.

The 3D information includes a 3D flag for identifying a 3D image signal or 3D format information.

The recording medium recording/playing unit 130 records the generated play list to the recording medium 135 together with a video stream of a 3D image.

Also, the recording medium recording/playing unit 130 reads a play list including 3D information and plays data by using the read play list.

The video decoder 150 processes data of the recording medium 135 in which the play list including 3D information is recorded, to at least one of a high image quality signal or a high sound quality signal.

A user may quickly find and play recording information by viewing the recorded play list or manipulating the recorded play list.

Hereinafter, a typical play list editing operation of a BD recorder/player as an example of the image recording/playing apparatus 100 according to the current exemplary embodiment will be described with reference to FIGS. 2, 3A through 3D, and 4.

Figure 2:
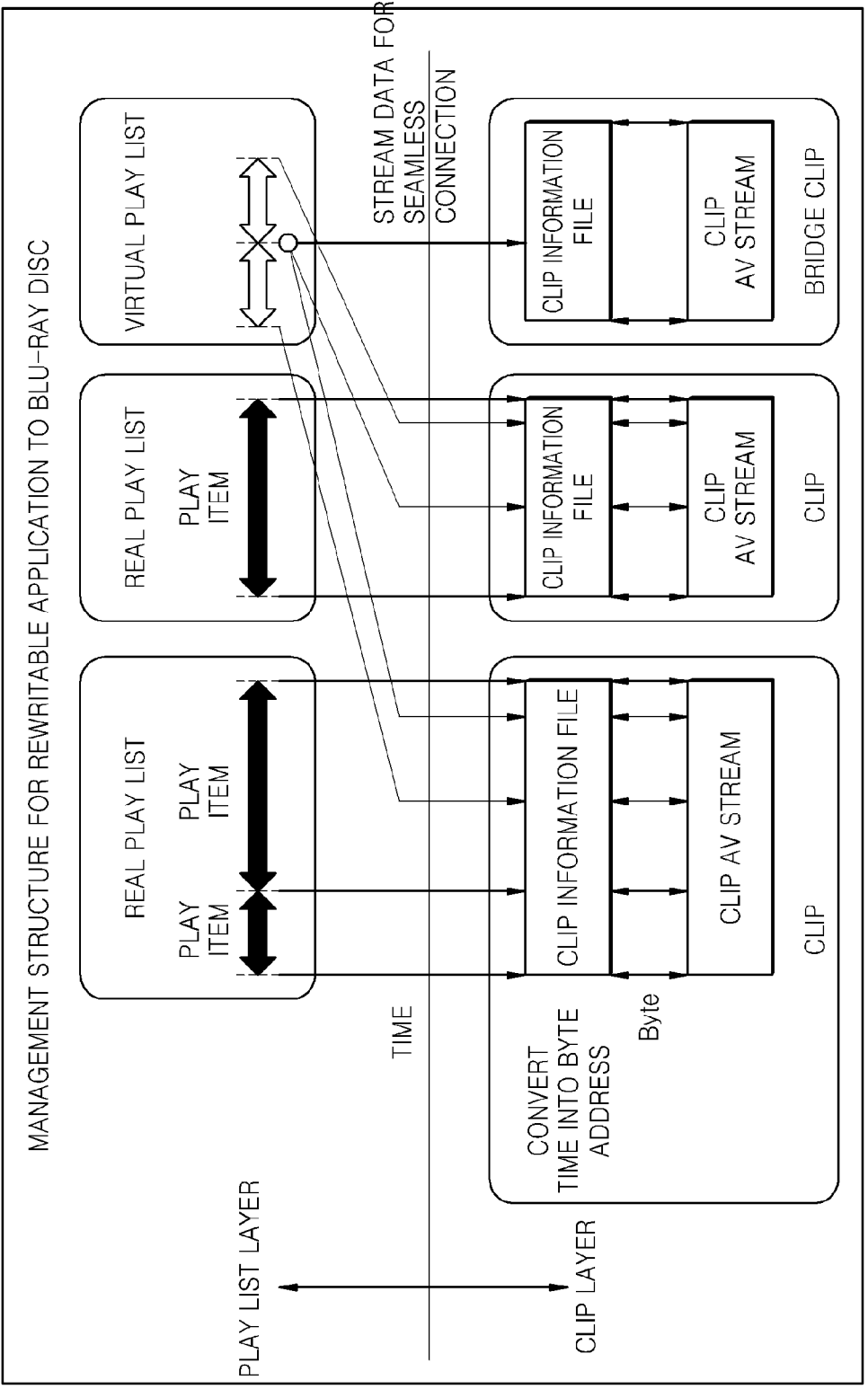
FIGS. 2, 3A through 3D, and 4 are schematic views illustrating an example of an image recording/playing apparatus according to an exemplary embodiment, showing an editing operation of a Blu-ray disk (BD) recorder/player.

FIG. 2 illustrates a data structure of an application format of a BD according to an exemplary embodiment.

The BD recorder/player uses a total of three types of files. An application format of a BD is divided into two layers, a play list layer and a clip layer. In the play list layer, a real play list and a virtual play list are present.

A play list includes at least one play item, and the BD recorder/player plays a play item in units of play lists. Also, the user may manipulate layers of the play list. The play list includes a title list which may be viewed on a screen of a display.

Meanwhile, in the clip layer, two types of files, that is, a clip audio/video (AV) stream file in which at least one of image data and sound data is stored, and a clip information file including management information for the clip audio/video stream file are present. In the present exemplary embodiment, a clip AV stream file and a clip information file correspond to each other in a one-to-one relationship. A clip AV stream file is formed of at least one packet.

Hereinafter, a relationship between a play list and a clip AV stream file/clip information file and a relationship between a clip AV stream file and a clip information file will be described.

The play list includes at least one play item. The play item includes in-time, which is play start time information, out-time, which is play end time information, and information indicating a clip information file corresponding to the play item.

The clip information file includes time information about each packet of a clip AV stream file corresponding to the clip information file and map information including position information corresponding to the time information.

In detail, the clip information file includes program information of a clip AV stream file (e.g., application type, recording rate, etc.) and characteristics point information (CPI).

The CPI is entry point information, and is a file that associates time information of a clip AV stream file with address information thereof.

The BD recorder/player plays a play list by using the in-time/out-time information of the play item and time information (or map information) of a clip AV stream file.

FIGS. 3A through 3D illustrate a relationship between a play list and a clip file when editing the play list.

In regard to BD AV data recorded in a BD, editing of a play list is possible according to the present exemplary embodiment.

Figure 3A:
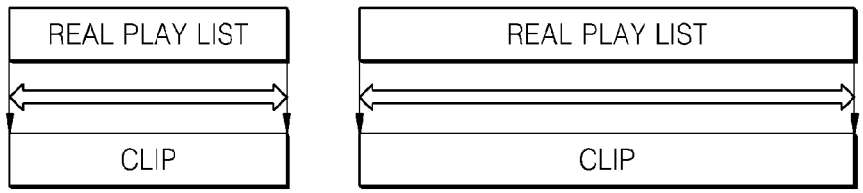

FIG. 3A illustrates a relationship between a real play list and a clip file before editing.

Figure 3B:
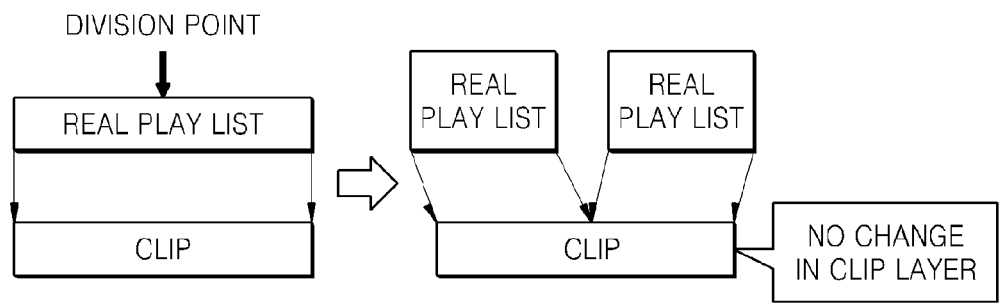

FIG. 3B illustrates division of a play list.

Figure 3C:
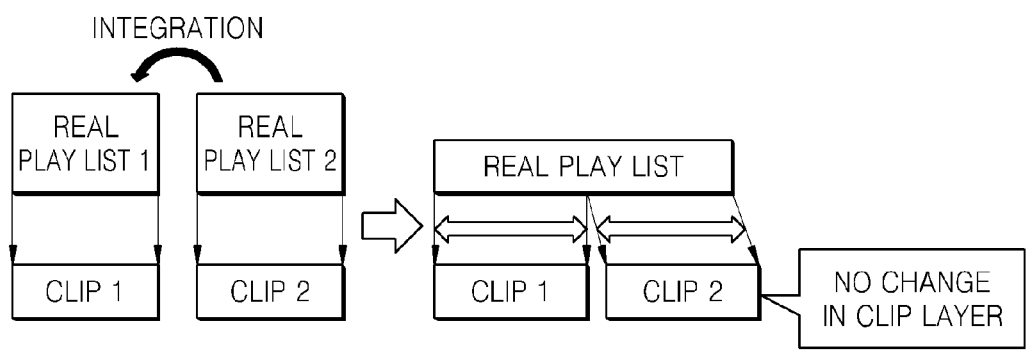

FIG. 3C illustrates integration of a play list.

Referring to FIGS. 3B and 3C, as a play list in the present exemplary embodiment is a file including only or mainly time information, a new play list may be created without processing a clip file even when the play list is divided or integrated.

Figure 3D:
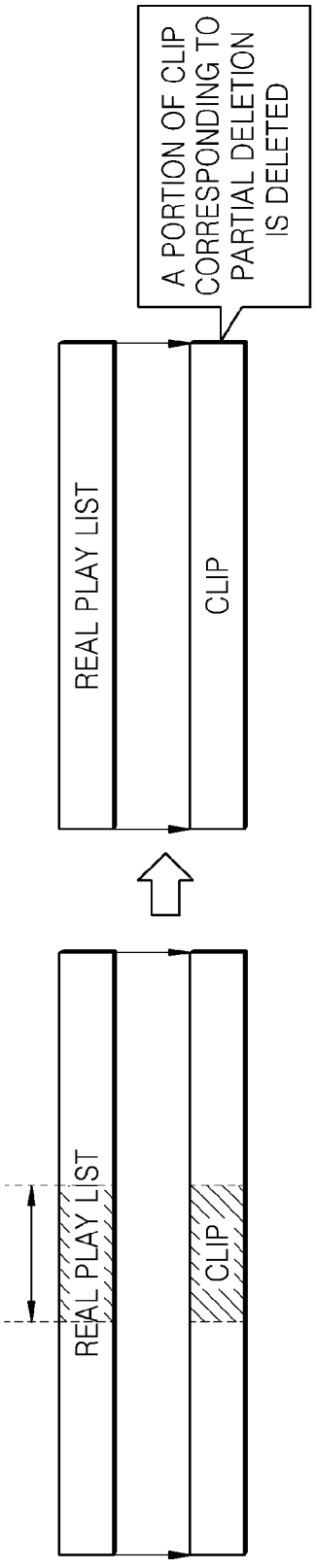

FIG. 3D illustrates a play list from which a portion thereof is deleted.

Figure 4:
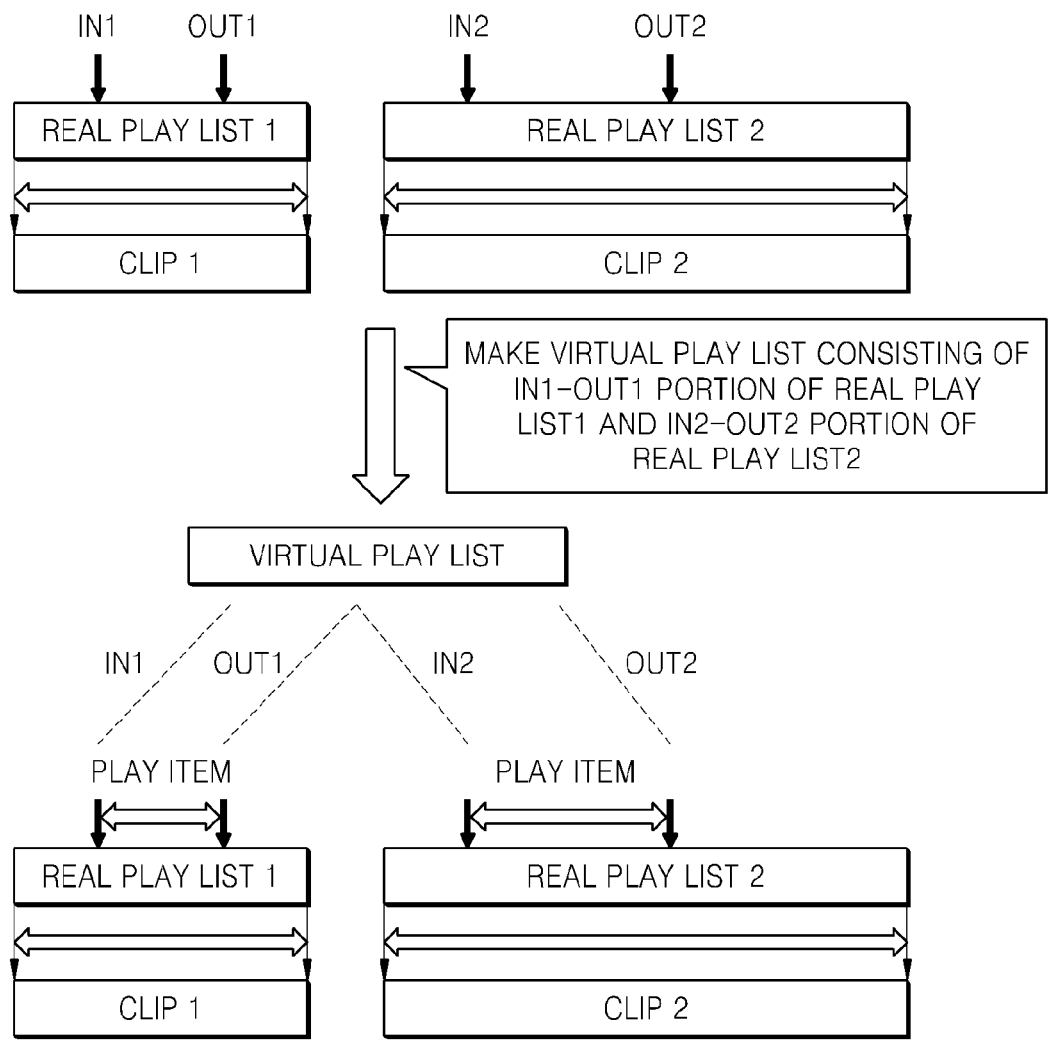

FIG. 4 illustrates a relationship between a play list and a clip file when a virtual play list is used.

One play list may be written by editing a scene. Since editing is possible without manipulating a clip file at all, editing or deleting of the virtual play list does not affect a clip file at all.

Figures 5, 6:
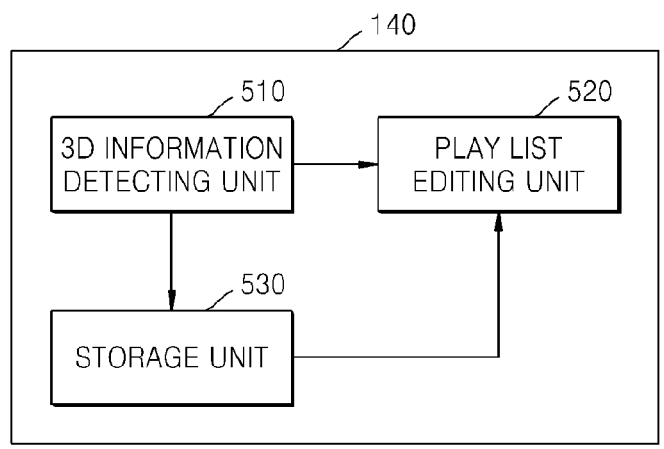
FIG. 5 illustrates a play list generating unit of FIG. 1 according to an exemplary embodiment.
FIG. 6 illustrates objects of a mapping table of a broadcasting channel and 3D format information accumulated in a storage unit of FIG. 5 according to an exemplary embodiment.

FIG. 5 illustrates the play list generating unit 140 (e.g., play list generator) of FIG. 1 according to an exemplary embodiment.

Referring to FIG. 5, the play list generating unit 140 includes a 3D information detecting unit 510 (e.g., 3D information detector), a play list editing unit 520 (e.g., play list editor), and a storage unit 530 (e.g., storage).

The 3D information editing unit 510 detects 3D information.

For example, the 3D information detecting unit 510 detects, from metadata of a broadcasting signal, a 3D flag that distinguishes 3D images from 2D images. Also, the 3D information detecting unit 510 detects 3D format information from metadata of a broadcasting signal. The metadata contains broadcasting program information.

The 3D format information is an element of image transmission technology and includes information indicating, for example, a 3D broadcasting format, but is not limited thereto.

To effectively use, for example, related art 2D transmission equipment for displaying 3D content, a 3D broadcasting format may include: a side-by-side format in which a left view image and a right view image are disposed respectively on the left and right sides at the same time and then processed as a single frame; a top-and-bottom format in which a left view image and a right view image are disposed respectively on top and bottom sides at the same time; and a frame packing format in which a left view image and a right view image are alternately disposed for each frame.

The side-by-side format, the top-and-bottom format, and the frame packing format use a 3D exclusive channel. However, standardization of a 2D+depth format, which may be broadcast in 3D broadcasting using a 2D channel, and an MVC format, which is used as a standard for Blu-ray, may be possible.

It is understood that 3D format information according to the current exemplary embodiment is not limited to the above-described 3D format information.

When the 3D information detecting unit 510 has detected an identification signal for distinguishing 2D/3D (e.g., a 3D flag) or an identification signal that indicates 3D format information, from metadata of a broadcasting signal, the play list editing unit 520 may automatically set a display of the play list to include the identification signal for 3D or the 3D format information.

The storage unit 530 pre-stores a mapping table between a broadcasting channel and 3D format information.

Accordingly, the play list editing unit 520 may set the display for a play list by referring to the mapping table in a stage where a broadcasting station channel is selected, even when the identification signal for distinguishing 3D from 2D or the identification signal that indicates 3D format information is not included in metadata of a broadcasting signal.

The storage unit 530 may include a cache memory, but is not limited thereto.

FIG. 6 illustrates an object of a mapping table of broadcasting channels and 3D format information accumulated in the storage unit 530, according to an exemplary embodiment.

While broadcasting channels and 3D format information may be stored in advance for each country in the storage unit 530, 3D format information corresponding to each broadcasting channel of each country may be distinguished.

According to the image recording/playing apparatus 100 of the current exemplary embodiment, when recording and storing 3D broadcasting in a recording medium, 3D format information is displayed on an editing list of the recording medium while referring to a mapping table of 3D format information in which 3D broadcasting information is accumulated in advance. Also, when editing an editing list recorded to the recording medium, a mixture of different 3D format information may be prevented.

Figures 7, 8A:
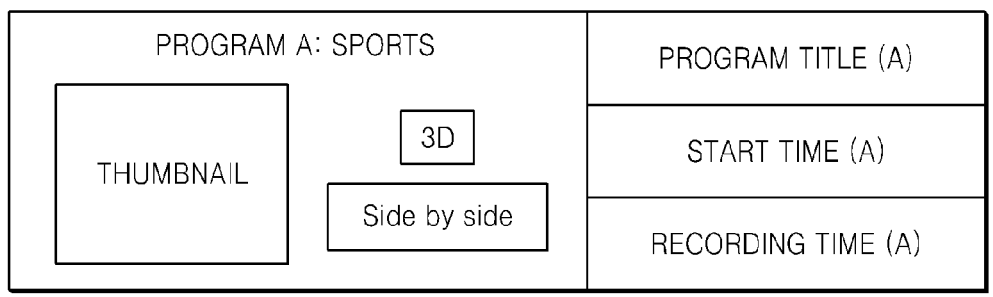
FIG. 7 illustrates a play list file according to an exemplary embodiment.
FIGS. 8A through 8C illustrate a play list according to an exemplary embodiment.

FIG. 7 illustrates a play list file according to an exemplary embodiment. The play list file may be a rewritable BD (BD-RE) play list file, but is not limited thereto.

Referring to FIG. 7, a file called "UIA_appinfoPlay List" may include information as follows.

"Length" refers to an amount of data of a play list, denoted by a bit length.

"Play list character set" denotes a character code set up of a play list (not shown).

"Play list Name" includes information of names of play lists. A capacity of "Play list Name" may be 8 bit*255 field=2040 bits.

"Record time and date" includes time information regarding when recording begins. A capacity of "record time and date" may be 56 bits.

"Play list duration" includes an interval of a play list, that is, information about a section from in-time to out-time. A capacity of "Play list duration" may be 24 bits.

"Three_dimensional_content_Flag" is a 1 bit flag indicating 3D information.

1 bit is allocated to each of "Three_dimensional_content_side by side," "Three_dimensional_content_top and bottom," "Three_dimensional_content_frame packing," and "Three_dimensional_content_2D+depth", and 3 bits is allocated to "reserved_for_Three_dimensional_content" indicating 3D format information.

For example, when a 3D side-by-side format is detected, a play list file as below may be set.

Three_dimensional_content_Flag=1 bit
Three_dimensional_content_side by side=1 bit
Three_dimensional_content_top and bottom=0 bit
Three_dimensional_content_frame packing=0 bit
Three_dimensional_content_2D+depth=0 bit
reserved_for Three_dimensional_content=0 bit The image recording/playing apparatus 100 may detect a play list including 3D format information from a recording medium and play the same.

Also, when a 2D image is broadcast in a 3D channel, a 3D flag of a broadcasting program becomes 0 bit, and 3D format information becomes 0 bit.

Figure 8B:
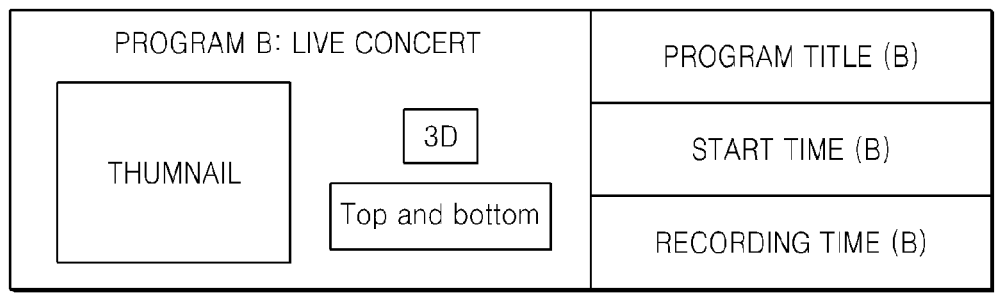
Figure 8C:
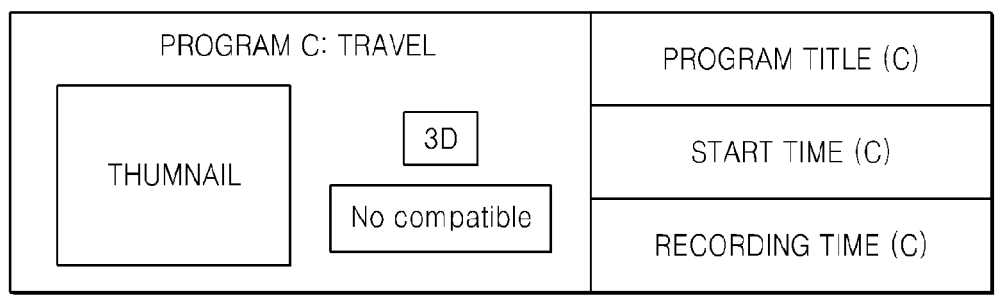

FIGS. 8A through 8C illustrate a play list displayed on a displaying unit (not shown) according to an exemplary embodiment.

Referring to FIGS. 8A through 8C, in a 3D broadcasting program recorded to a recording medium, a 3D icon denoting that the program is recorded in 3D and an icon indicating 3D format information are displayed.

FIG. 8A illustrates a play list displayed with an icon indicating that a corresponding program is in 3D and denotes that the corresponding program is in side-by-side 3D format.

FIG. 8B illustrates a play list displayed with an icon that a corresponding program is in 3D and denotes that the corresponding program is in top-and-bottom 3D format.

On the other hand, FIG. 8C illustrates unclear 3D format information. Here, a display may display, for example, nothing or may display "not compatibles" as shown in FIG. 8C. However, it is understood that a message indicating unclear 3D format information is not limited to the above-described message.

Also, a thumbnail indicating image contents is displayed on the left of the display, and title name, start time, and recording time of a broadcasting program are displayed on the right of the display.

Although not shown in FIGS. 8A through 8C, whether glasses are used or not may also be displayed together with the 3D format information together.

Figure 9:
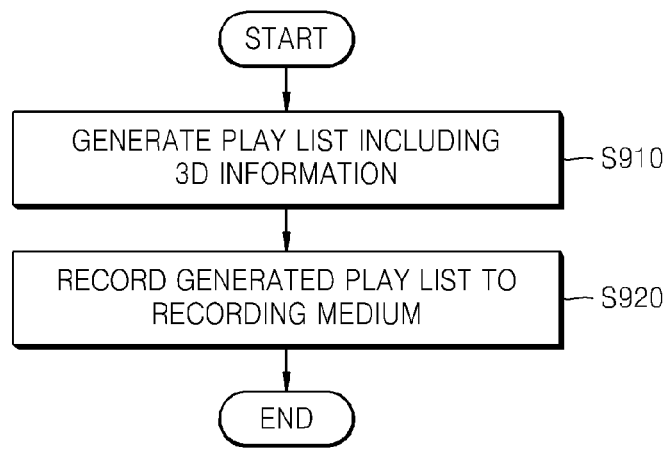
FIG. 9 is a schematic flowchart illustrating an image recording/playing method according to an exemplary embodiment.

FIG. 9 is a flowchart illustrating an image recording/playing method according to an exemplary embodiment. The method is the same as or similar to the operation of the image recording/playing apparatus 100 described above with reference to FIGS. 1, 2, 3A through 3D, 4, and 5 above, and thus, description of repeated elements will be omitted herein. In operation 910, an image recording/playing apparatus 100 generates a play list including 3D information.

3D information includes a 3D flag, 3D format information, or the like.

According to an exemplary embodiment, the image recording/playing apparatus 100 may detect 3D information based on metadata of a broadcasting signal or a mapping table between a broadcasting channel and 3D format information that is pre-stored in a storage unit 530.

In operation 920, the generated play list is recorded to a recording medium.

Figure 10:
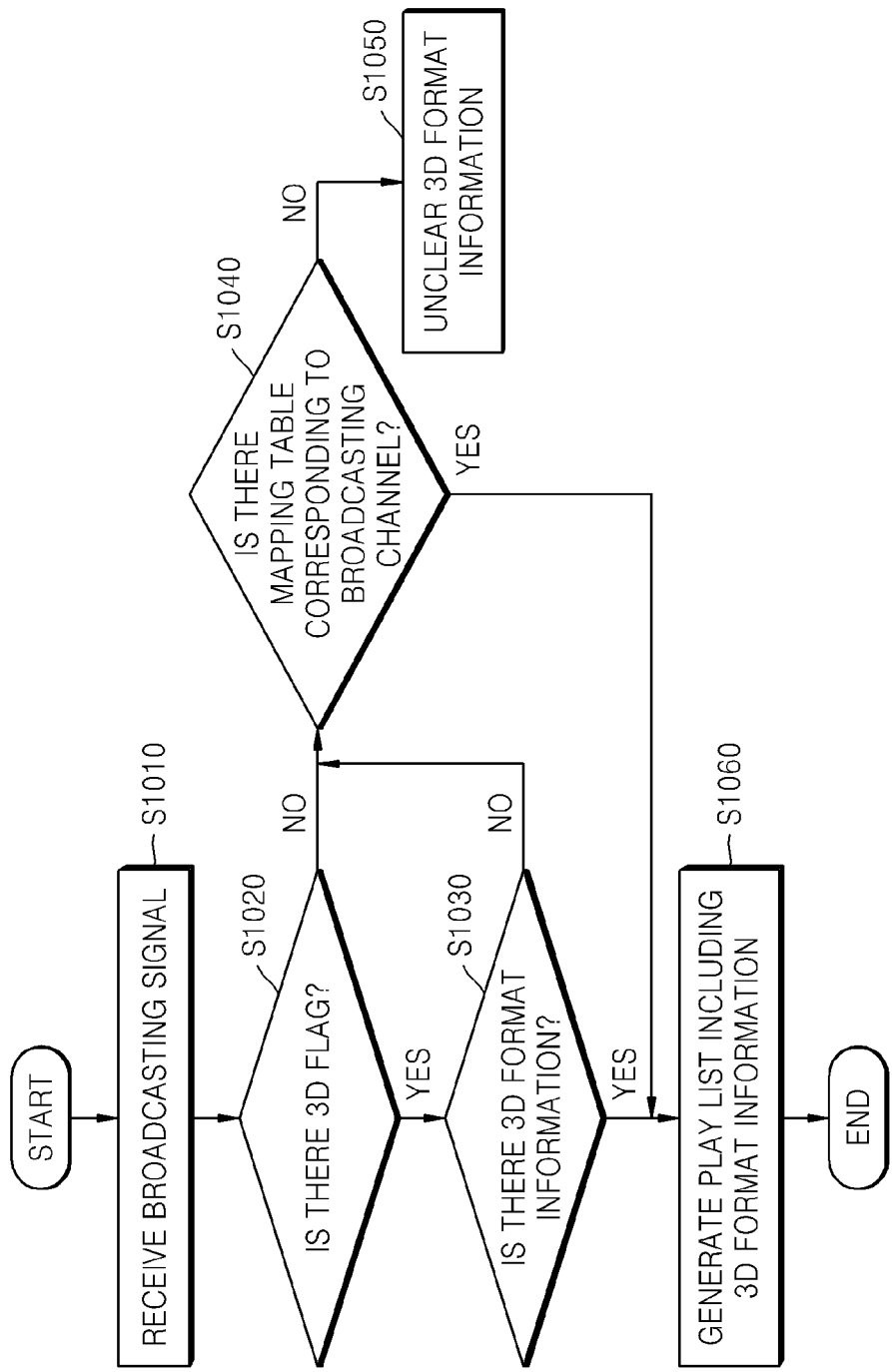
FIGS. 10 and 11 are detailed flowcharts illustrating an image recording/playing method according to an exemplary embodiment.

FIG. 10 is a detailed flowchart illustrating the image recording/playing method according to an exemplary embodiment.

Referring to FIG. 10, an operation for receiving a broadcasting signal to an operation for editing of a play list according to an exemplary embodiment is illustrated.

In operation 1010, a broadcasting signal is received.

In operation 1020, it is determined, based on metadata of the broadcasting signal, whether information, e.g., a 3D flag, indicating that a broadcasting signal includes 3D content is included in the metadata.

In operation 1030, when the 3D flag is included in the metadata, it is determined whether or not 3D format information is included in the metadata.

Meanwhile, in the case of a 3D exclusive channel, there is also a possibility that the 3D flag is not included in the metadata, and thus, it is determined, based on information of a broadcasting channel transmitted from the tuner unit 110 and the 3D format information, whether or not 3D format information is included in the metadata.

If the 3D flag is not included in the metadata and the 3D format information is not included in the metadata, the broadcasting signal is regarded as a 2D signal.

Alternatively, in operation 1040, if the 3D flag is included in the metadata but 3D format information is not included in the metadata, a mapping table between broadcasting channel information and 3D format information is referred to. Then, 3D format information corresponding to broadcasting channel information transmitted from the tuner unit 110 is searched for from the mapping table.

If the 3D flag is included in the metadata but the 3D format information is not included in the metadata or the mapping table, in operation 1050, information indicating that a 3D broadcasting signal having unclear 3D format information is received is displayed. For example, a message indicating unclear 3D format information may include a message such as "not available" or "not compatible."

The mapping table may also be referred to if neither the 3D flag nor the 3D format information is included in the metadata of the broadcasting signal. If 3D format information is not detected even by referring to the mapping table, the broadcasting signal is regarded as a 2D signal.

In operation 1060, if 3D format information is included in the metadata, a play list including the 3D format information is generated.

Figure 11:
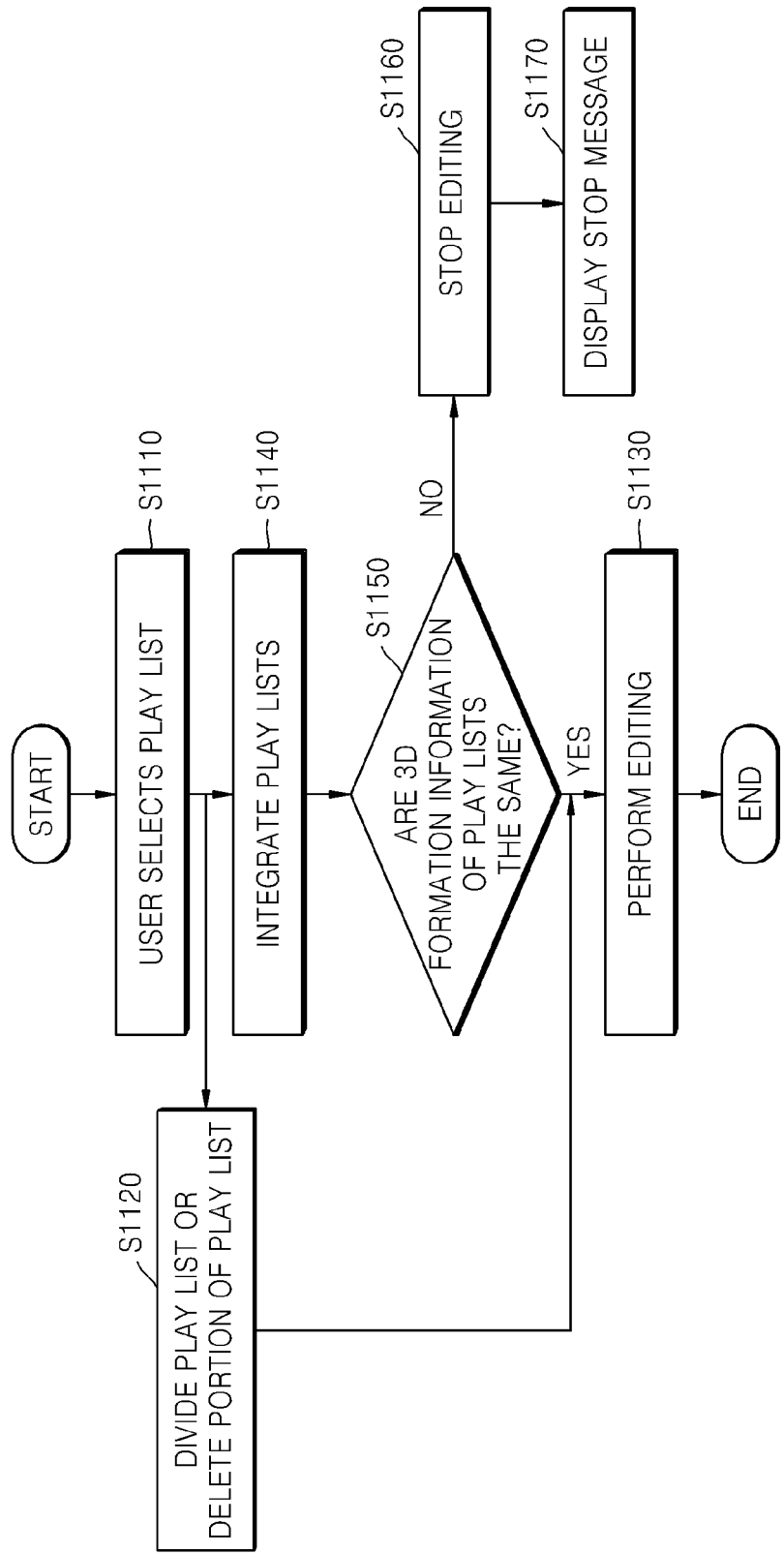

FIG. 11 is a detailed flowchart illustrating an image recording/playing method according to another exemplary embodiment.

The flowchart of FIG. 11 may be related to editing a BD including 3D format information in a play list, but is not limited thereto.

Referring to FIG. 11, in operation 1110, a user selects a play list to edit from a recording medium to which a plurality of 3D broadcasting programs are recorded.

In operation 1120, when dividing a play list of a 3D broadcasting program or deleting a portion thereof (refer to FIGS. 3B, 3D, and 4), editing may be performed in operation 1130.

On the other hand, when integrating play lists of 3D broadcasting programs in operation 1140, whether or not at least two play lists to be integrated include the same 3D format information is determined in operation 1150.

When at least two play lists to be integrated include the same 3D format information, editing (e.g., integrating) for the play lists may be performed in operation 1130. On the other hand, when at least two play lists to be integrated include different 3D format information, an editing operation for integrating play lists is stopped in operation 1160, and a stop message is displayed on a display in operation 1170.

Figure 12:
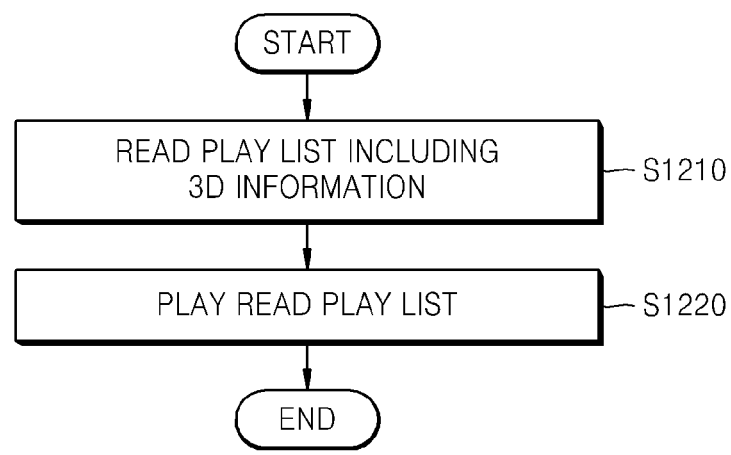
FIG. 12 is a schematic flowchart illustrating an image recording/playing method according to another exemplary embodiment.

FIG. 12 is a schematic flowchart illustrating an image recording/playing method according to another exemplary embodiment.

Referring to FIG. 12, in operation 1210, the image recording/playing apparatus 100 reads a play list including 3D information.

In operation 1220, the image recording/playing apparatus 100 plays data by using the read play list. The image recording/playing apparatus 100 displays the play list in which the 3D information is included.

The user may stop integral editing of play lists in which different 3D format information is included based on the play list including 3D information. The user may refer to the play list of FIGS. 8A through 8C.

According to the image recording/playing method according to exemplary embodiments, the problems as follows of the related art may be solved.

As 3D broadcasting formats vary according to broadcasting stations or transfer paths, 3D broadcasting formats may vary even within the same country. Although a related 3D TV is able to play a 3D broadcasting format, if a new broadcasting format is introduced in the future, it is anticipated that as the number of broadcasting formats increases, an owner of a TV may not know to which format the TV corresponds, and may be confused when playing recorded 3D contents.

In addition, when recording 3D contents to a related art BD recorder, 2D broadcasting and 3D broadcasting are currently not distinguished, and thus the user records broadcasting as is. When a TV that is connected to the related art BD recorder corresponds to playing of 3D content, the user may select a 3D broadcasting format, wear glasses, and play contents.

However, as the related art BD recorder is both unable to distinguish 2D and 3D and unable to determine a broadcasting format, when the user edits a play list in a 2D state and plays the edited play list in 3D, problems such as a screen freeze at a conversion point of editing due to the different broadcasting formats may occur. In addition, if the number of 3D broadcasting formats increases in the future, compatibility problems may occur in which a playlist edited by a user and stored onto a recording medium may not be playable on a TV owned by another user.

Accordingly, according to the image recording/playing method of exemplary embodiments, a system may be established such that compatibility is also provided even if the number of 3D broadcasting formats increases so that user may not experience confusion.

In addition, according to the method of image recording/playing method of exemplary embodiments, users' attention may be aroused even while editing play lists and editing of play lists by using another 3D format may be prevented.

The image recording/playing method according to exemplary embodiments can be written as computer programs and be implemented in general-use digital computers that execute the computer programs using a computer readable recording medium. Examples of the computer readable recording medium include all kinds of recording devices in which computer readable data is stored.

Exemplary can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing exemplary embodiments can be easily construed by programmers of ordinary skill in the art to which exemplary embodiments pertain. Moreover, it is understood that in exemplary embodiments, one or more units of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of exemplary embodiments but by the appended claims, and all differences within the scope will be construed as being included in the present inventive concept.

The invention claimed is:

1. A method of recording an image by using an image recording apparatus, the method comprising:
   generating, based on a received broadcasting signal, a play list including three-dimensional (3D) information; and
   recording the generated play list to a recording medium,
   wherein the included 3D information comprises at least one of a 3D flag for identifying a 3D image signal and 3D format information,
   wherein the generated play list comprises at least one play item,
   wherein the at least one play item comprises play start time information, play end time information, and a clip information file corresponding to the at least one play item,
   wherein the clip information file comprises information about a position and time of a packet in a clip audio/video (AV) stream file corresponding to the clip information file,
   wherein the generating comprises detecting the 3D information from at least one of metadata of the received broadcasting signal and a mapping table between broadcasting channels and the 3D format information, and
   wherein the generating further comprises generating a play list including information indicating that the 3D format information is unclear when the 3D flag is detected but the 3D format information is not detected from the broadcasting signal.

2. The method of claim 1, wherein the generating comprises stopping integration of play lists in which different 3D format information are included.

3. The method of claim 1, wherein the generating further comprises generating a play list including information indicating a 2D image signal when both of the 3D flag and the 3D format information are not detected.

4. The method of claim 1, wherein the generating comprises generating a play list including information about whether glasses are used to view the image, based on the 3D format information.

5. The method of claim 1, further comprising reproducing, by the image recording apparatus, the packet.

6. The method of claim 1, wherein the clip AV stream file and the clip information file have a one-to-one correspondence relationship.

7. A non-transitory computer readable recording medium having recorded thereon a program executable by a computer for performing the method of claim 1.

8. The method of claim 1, wherein the generating comprises detecting the 3D information from a pre-stored mapping table between broadcasting channels and the 3D format information.

9. The method of claim 1, wherein the 3D information comprises the 3D format information which indicates a 3D format of the play list from among at least one of a top and bottom format and a side by side format.

10. An image recording apparatus comprising:
   a play list generator which generates, based on a received broadcasting signal, a play list including three-dimensional (3D) information; and
   a recorder which records the generated play list to a recording medium,
   wherein the included 3D information comprises at least one of a 3D flag for identifying a 3D image signal and 3D format information,
   wherein the generated play list comprises at least one play item,
   wherein the at least one play item comprises play start time information, play end time information, and a clip information file corresponding to the at least one play item,
   wherein the clip information file comprises information about a position and time of a packet in a clip audio/video (AV) stream file corresponding to the clip information file,
   wherein the play list generator comprises:
      a 3D information detector which detects the 3D information from at least one of metadata of the received broadcasting signal and a mapping table between broadcasting channels and the 3D format information; and
      a storage which stores the mapping table, and
   wherein the play list generator generates a play list including information indicating that the 3D format information is unclear when the 3D flag is detected but the 3D format information is not detected from the broadcasting signal.

11. The image recording apparatus of claim 10, wherein the play list generator stops integration of play lists in which different 3D format information are included.

12. The image recording apparatus of claim 10, wherein the play list generator generates a play list including information indicating a 2D image signal when both of the 3D flag and the 3D format information are not detected.

13. The image recording apparatus of claim 10, wherein the play list generator generates a play list including information about whether glasses are used to view the image, based on the 3D format information.

14. A method of playing an image by using an image playing apparatus, the method comprising:
   reading, from a storage medium, a play list including three-dimensional (3D) information corresponding to a previously-received broadcasting signal; and
   playing the image by using the read play list,
   wherein the included 3D information comprises at least one of a 3D flag for identifying a 3D image signal and 3D format information,
   wherein the read play list comprises at least one play item,
   wherein the at least one play item comprises play start time information, play end time information, and a clip information file corresponding to the at least one play item,
   wherein the clip information file comprises information about a position and time of a packet in a clip audio/video (AV) stream file corresponding to the clip information file, and
   wherein the play list includes information indicating that the 3D format information is unclear when the 3D flag is detected but the 3D format information is not detected from a broadcasting signal based on which the play list is generated.

15. A non-transitory computer readable recording medium having recorded thereon a program executable by a computer for performing the method of claim 14.

16. An image playing apparatus comprising:
a player which reads, from a storage medium, a play list including three-dimensional (3D) information corresponding to a previously-received broadcasting signal and plays data by using the read play list,
wherein the included 3D information comprises at least one of a 3D flag for identifying a 3D image signal and 3D format information,
wherein the read play list comprises at least one play item,
wherein the at least one play item comprises play start time information, play end time information, and a clip information file corresponding to the at least one play item,
wherein the clip information file comprises information about a position and time of a packet in a clip audio/video (AV) stream file corresponding to the clip information file, and
wherein the play list includes information indicating that the 3D format information is unclear when the 3D flag is detected but the 3D format information is not detected from a broadcasting signal based on which the play list is generated.

17. A non-transitory recording medium comprising an image signal and a play list about the image signal,
wherein the play list about the image signal comprises three-dimensional (3D) information corresponding to a previously-received broadcasting signal,
wherein the 3D information comprises at least one of a 3D flag which identifies, to a computer, that the image signal is a 3D image signal, and 3D format information which identifies, to the computer, a format of the 3D image signal,
wherein the play list comprises at least one play item,
the at least one play item comprises play start time information, play end time information, and a clip information file corresponding to the play item,
wherein the clip information file comprises information about a position and time of a packet in a clip audio/video (AV) stream file corresponding to the clip information file, and
wherein the play list includes information indicating that the 3D format information is unclear when the 3D flag is detected but the 3D format information is not detected from a broadcasting signal based on which the play list is generated.

18. A method of editing a play list including three-dimensional (3D) information, the method comprising:
determining whether first 3D information of a first play list and second 3D information of a second play list include same 3D format information;
integrating the first play list and the second play list in response to the first 3D information and the second 3D information including the same 3D format information,
wherein the first play list comprises at least one play item,
wherein the at least one play item comprises play start time information, play end time information, and a clip information file corresponding to the at least one play item,
wherein the clip information file comprises information about a position and time of a packet in a clip audio/video (AV) stream file corresponding to the clip information file,
wherein the first play list is different from the second play list, and
wherein the first play list and the second play list are integrated in response to the first play list and the second play list including the same 3D format information.

19. The method of claim 18, further comprising selecting the first play list from a recording medium to which a plurality of 3D broadcasting programs are recorded.

20. A non-transitory computer readable recording medium having recorded thereon a program executable by a computer for performing the method of claim 18.

* * * * *